United States Patent [19]

Schwartz et al.

[11] 4,169,262
[45] Sep. 25, 1979

[54] VIDEO DISPLAY CIRCUIT FOR GAMES, OR THE LIKE

[75] Inventors: Samuel A. Schwartz, Saratoga; Peter C. Salmon, Los Altos; Gary T. Bastian, Santa Jose, all of Calif.

[73] Assignee: Intel Corporation, Santa Clara, Calif.

[21] Appl. No.: 852,212

[22] Filed: Nov. 17, 1977

[51] Int. Cl.² ............................................. G06K 15/20
[52] U.S. Cl. .................. 340/744; 273/101.2; 273/DIG. 28; 340/750; 340/706; 340/800
[58] Field of Search ................ 340/324 AD, 744, 750

[56] References Cited

U.S. PATENT DOCUMENTS

| | | | |
|---|---|---|---|
| 3,614,767 | 10/1971 | Carrell | 340/324 AD |
| 3,778,810 | 12/1973 | Hayashi | 340/324 AD |
| 3,827,041 | 7/1974 | Cook | 340/324 AD |
| 3,854,130 | 12/1974 | Ligocki | 340/324 AD |
| 4,011,556 | 3/1977 | Tochitani et al. | 340/744 |
| 4,068,225 | 1/1978 | Lee | 340/750 |
| 4,116,444 | 9/1978 | Mayer et al. | 340/324 AD |
| 4,117,469 | 9/1978 | Levine | 340/750 |

*Primary Examiner*—David L. Trafton
*Attorney, Agent, or Firm*—Blakely, Sokoloff, Taylor & Zafman

[57] ABSTRACT

A circuit realizable on a single substrate, for interfacing between a digital processor and a raster scanned, video display particularly suitable for games, or the like. In the presently preferred embodiment, up to thirty-two objects may be simultaneously displayed. Content addressable memories (CAMs) which compare beam location with desired object location are employed to locate objects on the display. Fewer than thirty-two CAMs are employed to locate thirty-two objects with the circuit's "grouped major system". The display circuit includes another subsystem ("minor system") for displaying patterns with a minimum of control by the processor.

15 Claims, 3 Drawing Figures

VIDEO DISPLAY CIRCUIT FOR GAMES, OR THE LIKE

BACKGROUND OF THE INVENTION:

1. Field of the Invention

The invention relates to digital storage and display means for generating video signals.

2. Prior Art

Interfacing a digital processor or computer with a raster scanned display, such as on a standard television receiver, presents numerous unique design problems. Copending application Ser. No. 780,967, filed March 24, 1977 now U.S. Pat. No. 4,119,955, "Circuit For Display, Such As Video Game Display", assigned to the assignee of this application, describes one circuit for providing such an interface. This circuit permits the display of a plurality of different patterns on a raster scanned, cathode ray tube and includes means for detecting the coincidence of patterns and the coincidence of patterns with a grid. Content addressable memories (CAMs) are employed to compare the horizontal and vertical beam location with desired object locations. When a match occurs, a pattern is read from a memory and used to control the display's beam.

The circuit described in this copending application requires a separate CAM for each object. Thus, where thirty-two objects are displayable, thirty-two CAMs are used. These CAMs require a substantial amount of substrate area, making it difficult to realize, by way of example, a thirty-two object system on a single substrate. As will be described, the present invention permits the display of up to thirty-two objects, however, with fewer than thirty-two CAMs. In the grouped major system described in this application, four objects are located on the display with one CAM.

In the above mentioned copending application, all objects were treated alike. In the present application, minor systems are employed to handle certain objects. The minor systems allow the efficient handling of these objects with a minimum of processor control and with a maximum of display flexibility.

SUMMARY OF THE INVENTION

A circuit which receives digital signals from a processor and provides a control signal for a video display is described. The circuit includes a plurality of minor systems, each of which includes a memory for storing patterns for the display. Addressing means provides addresses to permit line-by-line accessing of these stored patterns in the memory. This addressing means receives a first timing signal from the display and provides the addresses in response thereto. A shift register means receives the stored patterns from the memory and provides the control signal for the display. Location means are also employed for locating objects on the display. This location means provides a second timing signal for the shift register means. The location means is adaptable for coupling both to the processor and the display. The output from the shift register means provides the control signal for the video display.

DETAILED DESCRIPTION OF THE INVENTION:

A circuit is described which receives digital signals from a processor and provides a control signal for a raster scanned, video display. The invented circuit is employed as an interface between a microprocessor or microcomputer such as a "game chip" and the video display. The circuit is primarily employed to locate objects on the video display and for providing a video control signal for the display's beam in order that different patterns may be displayed. In its presently preferred embodiment, thirty-two objects may be simultaneously located and displayed.

In its presently preferred embodiment, the described circuit is fabricated employing metal-oxide-semiconductor (MOS) technology as a large scale integrated circuit. In particular, n-channel, field-effect devices employing polycrystalline silicon gates are used. However, the invented display circuit may be realized with other technologies.

Also in the following description, many specific details such as specific number of bits, specific times and other details are given to provide a thorough understanding of the present invention. It will be apparent to one skilled in the art that these specific details are not required to employ the present invention. In other instances in the following description, well-known circuits are shown in block diagram form in order not to obscure this application in unnecessary detail.

Figure 1:
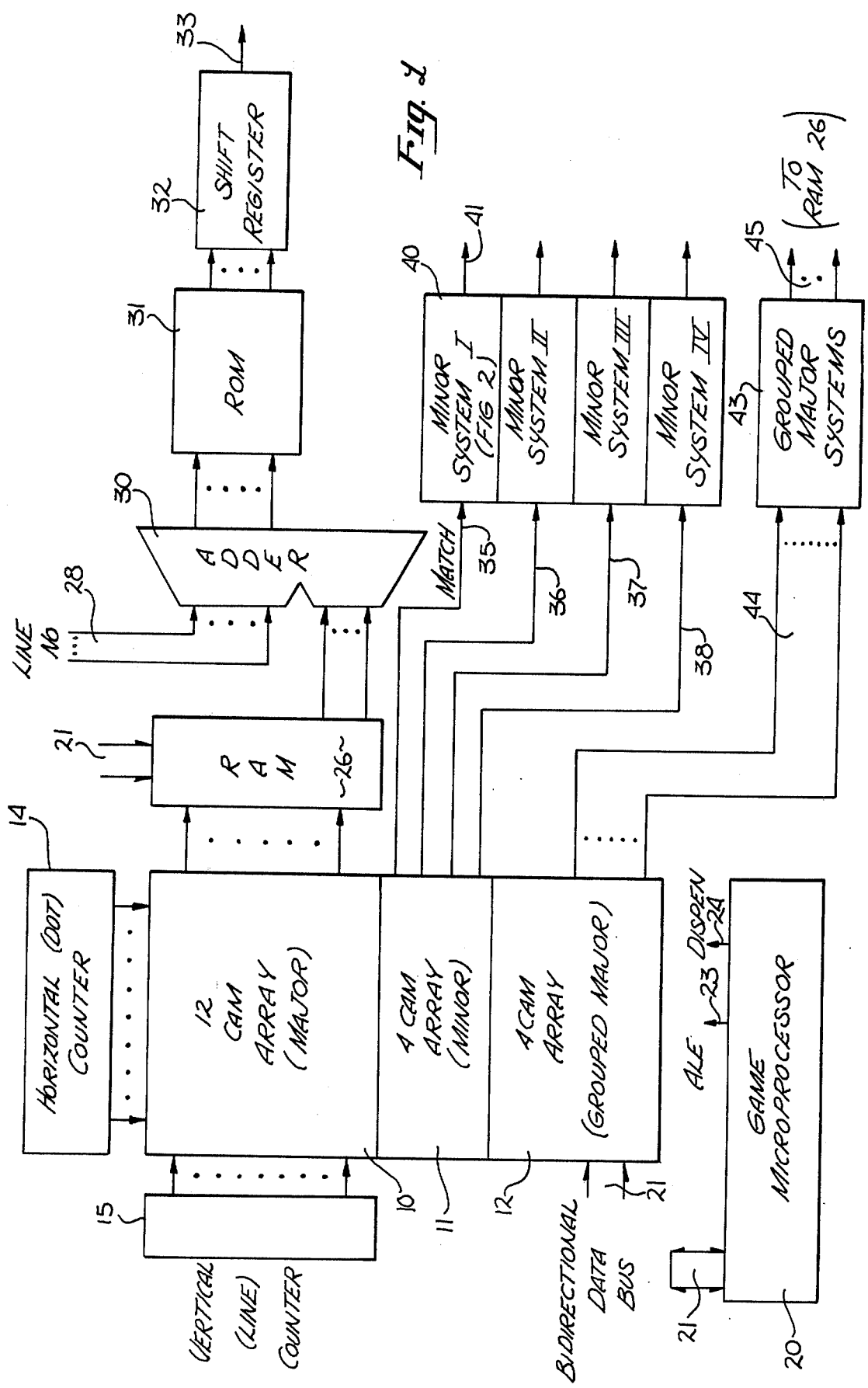
FIG. 1 is a general block diagram of the invented display circuit.

Referring to FIG. 1, the circuit of the present invention is controlled by a microprocessor or microcomputer shown as a game microprocessor 20. This microprocessor communicates with the invented circuit on a bidirectional data bus 21. A plurality of well-known control signals are communicated to the circuit from the microprocessor 20 on lines which are not illustrated. Two control signals which are illustrated in the drawings are address latch enable (ALE) (line 23) and display enable (DISPEN) (line 24).

The display circuit, in the presently preferred embodiment, is divided into three sections referred to as the major system, minor systems, and grouped major systems. The major system is constructed and operates generally as described in the previously mentioned copending application Ser. No. 780,967, filed Mar. 24, 1977 and assigned to the assignee of this application. The major system is employed to display major objects which are not necessarily grouped. Four minor systems are employed, each of which is used to display an object; one such minor system will be described in detail in conjunction with FIG. 2. Minor systems are particularly useful for displaying smaller objects, for example, a ball, bullet or other moving projectile in a game. Each of the four grouped major systems, one of which shall be described in detail in conjunction with FIG. 3, is employed to display grouped objects such as letters, scores, etc. With this system each displayed pattern in the group may be different.

In the major, grouped major and minor systems content addressable memories (CAMs) are employed to compare the beam position or location with the desired location of an object. When a match occurs, pattern data which is stored in either random-access memories (RAMs) or read-only memories (ROMs) is transferred into shift registers and then shifted at the appropriate rate to provide a video control signal. In the presently preferred embodiment, a twelve CAM array 10 (FIG. 1) is employed by the major system to locate (position) twelve objects on the display. A four CAM array 11 is employed by the minor system to locate four minor objects. The grouped major systems employ a four CAM array 12 which locates four groups of four objects on the display. Thus, with the CAM array 12, sixteen patterns may be displayed. With the arrays 10, 11 and 12, a total of thirty-two objects may be displayed with twenty CAM arrays.

Each of the CAM arrays receive an eight-bit digital signal from a horizontal (dot) counter 14 and an eight-bit digital signal from a vertical (line) counter 15. The contents of these counters represents the horizontal and vertical location of the beam. Counter 14 is reset for each line; counter 15 is reset for each frame. The desired location for each of the objects is communicated to the CAMs from the microprocessor 20 over the bidirectional data bus 21.

When a match condition occurs, it is communicated to a RAM 26 for the major system. In the RAM 26, with information provided from the microprocessor 20, a particular pattern is identified and this information coupled to the adder 30. A line number is communicated to this adder on lines 28 from the microprocessor 20. The output from the adder 30 provides an address signal to access the appropriate pattern (line-by-line) stored within a ROM 31. The output of the ROM is coupled in parallel to a shift register 32, and is shifted serially from register 32 to provide a video control signal on line 33. This major system is described in detail in the above referenced copending application, Ser. No. 780,967, filed Mar. 24, 1977.

The CAM array 11, like the CAM array 10, receives the desired object locations for a maximum of four objects from the microprocessor 20 on bus 21. It also compares this data with the contents of the counters 14 and 15. When a match condition occurs in one or more of these four arrays, it is communicated to the minor systems 40 on one or more of the lines 35, 36, 37, or 38. The minor systems then provide the appropriate pattern information for each of the matches. For example, a video control signal may be provided on line 41 for the Minor System I, as will be discussed in greater detail in conjunction with FIG. 2.

The array 12 as is the case with arrays 10 and 11, receives the desired object location information on bus 21 and compares it with the contents of the counters 14 and 15. When a match occurs, this condition is communicated on lines 44 to the grouped major systems 43. These systems provide signals on lines 45 to the RAM 26 as will be described in detail in conjunction with FIG. 3. These signals are used in the same manner to control the display as the output of CAM array 12 of the major system.

Figure 2:
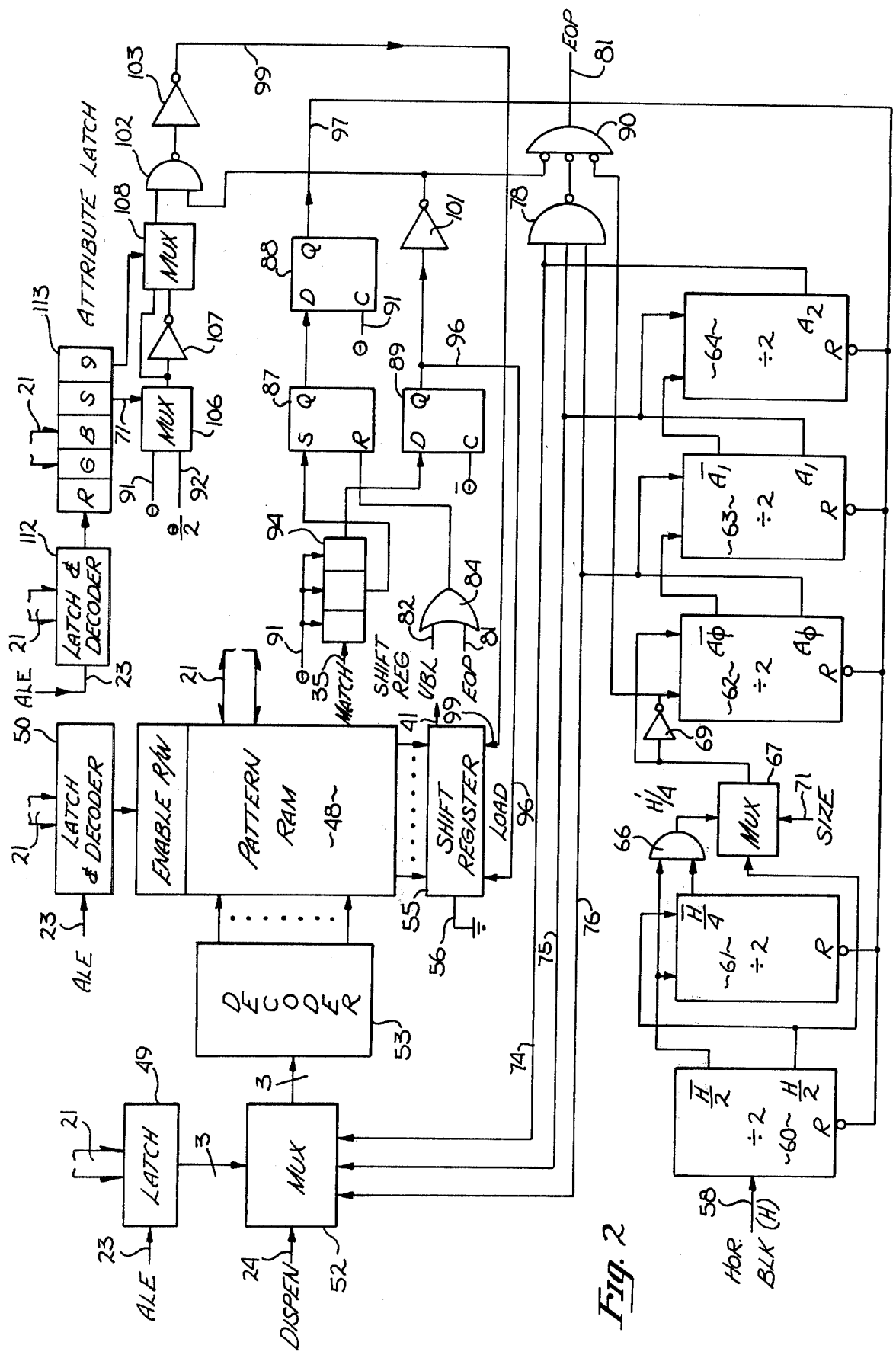
FIG. 2 is a detailed block diagram of one of the minor systems employed in the display circuit of FIG. 1.
Figure 3:
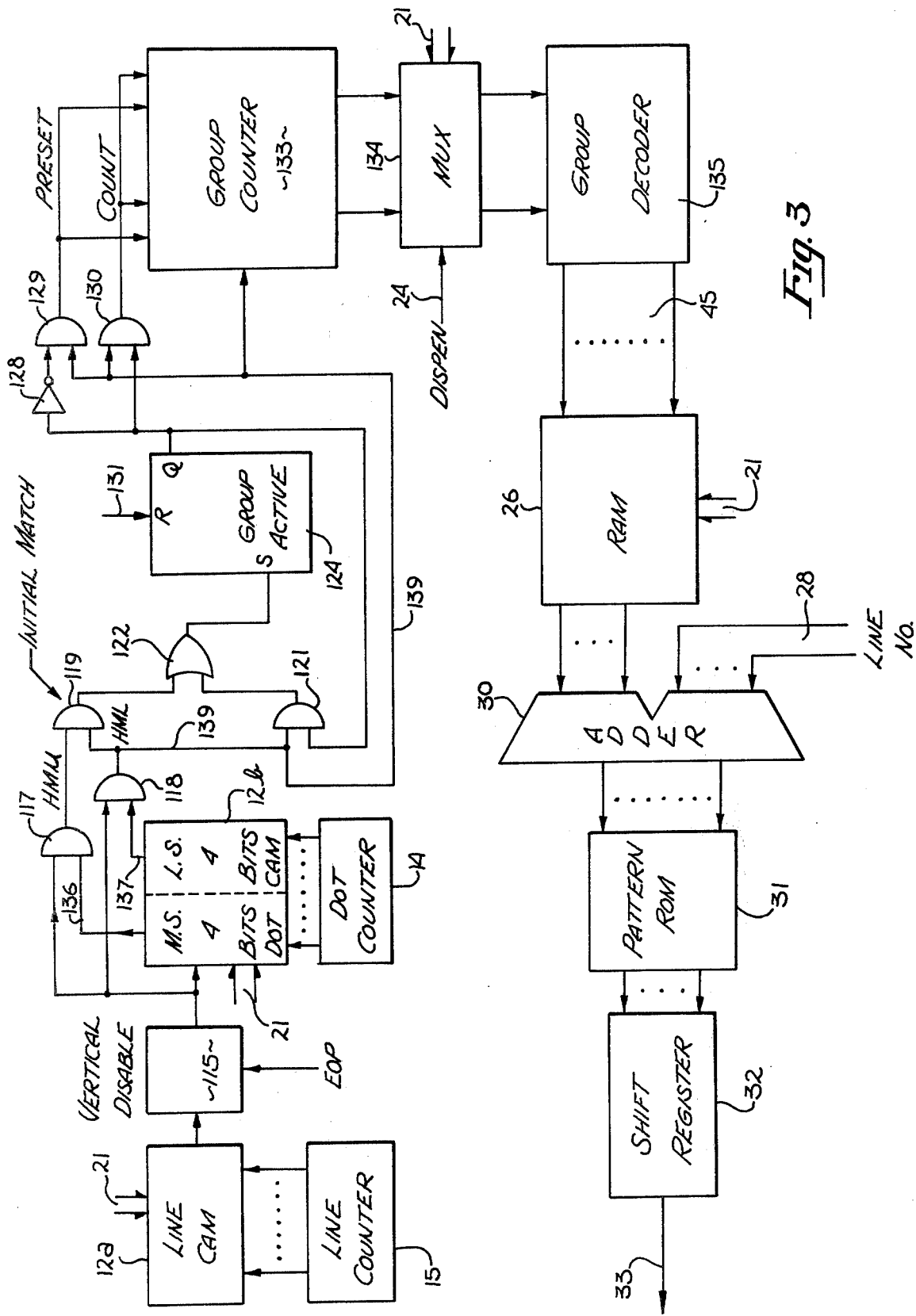
FIG. 3 is a detailed block diagram of one grouped major system employed in the display circuit of FIG. 1.

Referring now to the minor system of FIG. 2, this system receives a match condition signal on line 35 which line is coupled to the three stage shift register 94. The output video control signal, line 41, is provided at the output of the shift register 55. In the presently preferred embodiment, the pattern information is stored in a random-access memory (RAM) 48. This sixty-four bit (8×8) memory receives pattern data on bus 21 from the microprocessor 20 of FIG. 1. The RAM 48 is selected by a latch and decoder 50. This latch and decoder receives signals from the microprocessor 20 and determines if the RAM 48 has been selected. Note that this latch and decoder is necessary since four minor systems are employed, thus necessitating some means for determining which one of the four minor systems have been selected to receive pattern data. The RAM 48 receives decoded address signals for sequentially selecting each of its eight lines of eight-bits from the decoder 53. The decoder 53 receives signals through the multiplexer 52. The multiplexer 52 selects either the three lines 74, 75 and 76 or the three lines from the latch 49. The multiplexer 52 is controlled by the DISPEN (display enable) signal (line 24). The latch 49 receives information from the microprocessor on bus 21. This latch is enabled by the ALE (address latch enable) signal, line 23. The eight-bit word output of RAM 48 is transferred in parallel to the shift register 55. This shift register receives a load signal on line 96 and a clocking signal on line 99 to control the shifting of the pattern information onto line 41. Line 56 couples the first stage of the register 55 to ground to assure that as information is shifted from the register 55, all binary zeros are moved into the register.

Address signals on the lines 74, 75 and 76 are generated by an addressing means which includes a plurality of divide-by-two counters 60 through 64. The counter 60 receives the horizontal blanking signal from the video display on line 58. The counter 60 divides this signal by two and provides output timing signals H/2 and $\overline{H}/2$. The $\overline{H}/2$ signal is coupled to one input terminal of the AND gate 66, and is employed as a driving signal for the counter 61. The H/2 signal is coupled to one input terminal of the multiplexer 67 and is employed as a driving signal for the counter 61. The output signal of counter 61 ($\overline{H}$)/4 is coupled to the other input terminal of the AND gate 66. The output of the AND gate 66 designated as H'/4 is coupled to the other input terminal of the multiplexer 67. The multiplexer 67 receives a control signal designated as "size" on line 71. The output of multiplexer 67 is coupled to the input of an inverter 69 and is coupled as a driving signal for the counter 62. The output of inverter 69 is used as the other driving signal for the counter 62. The output of counters 62 designated as $A_\phi$ and $\overline{A}_\phi$ are coupled to the input terminals of the counter 63. The $A_\phi$ signal is also coupled to a line 76. The output signals of the counter 63 designated as $\overline{A}_1$ and $A_1$ are coupled to the input terminals of the counter 64. The $A_1$ signal is coupled to line 75. An output signal from counter 64 designated as $A_2$ is coupled to line 74. The reset terminals of the counters 60, 61, 62, 63 and 64 are coupled to a line 97.

The lines 74, 75 and 76 is addition to being coupled to the multiplexer 52 are coupled to the input terminals of a NAND gate 78. The output of this NAND gate is coupled to one input terminal of an inverting AND gate 90. Another input terminal of this gate is coupled to line 96 through inverter 101 and the remaining input terminal to gate 90 is coupled to receive the output signal from the inverter 69. The gate 90 generates an end of pattern (EOP) signal on line 81. This signal, as will be explained in greater detail, is coupled to one input terminal of the OR gate 84.

The OR gate 84 in addition to receiving the EOP signal receives a vertical blanking signal on line 82. The output of this gate is coupled to the R terminal of the bistable circuit 87. As mentioned, the match condition signal, line 35, is coupled to the first stage of the three-bit shift register 94. This shift register receives the timing signal $\theta$ (3.58 Mhz) on line 91. The second stage of this register is coupled to the "set" terminal of the bistable circuit 87. The output of register 94 is coupled to the D terminal of the bistable circuit 89. The C terminal of this bistable circuit receives the $\theta$ signal. The Q output of the bistable circuit 89 (line 96) is the load signal for the shift register 55; this signal is also coupled to the inverter 101. The Q output of the bistable circuit 87 is coupled to the D terminal of the bistable circuit 88. The C terminal of this bistable circuit receives the $\theta$ timing signal, line 91. The Q output of the bistable circuit 88 (line 97) provides the reset signal for the counters 60 through 64.

An attribute latch 113 receives data from the microprocessor. This latch is enabled by the latch and decoder 112, as will be described in greater detail. The latch 113 stores color data for the display in the stages designated as R (red), G (green), B (blue). The S stage of latch 113 is coupled to the multiplexer 106 by line 71 and as will be explained determines one of two sizes for the patterns. This bit is employed by the multiplexer 106 to select either the $\theta$ timing signal (line 91) or the $\theta/2$ timing signal (line 92). The output of the multiplexer 106 is coupled directly to the multiplexer 108 and is also coupled to the multiplexer 108 through the inverter 107. One of these two lines is selected depending upon the contents of the "9" stage of the latch 113. As will be explained, the data in the "9" stage is a ninth-bit (least significant bit) of horizontal location data. The output of the multiplexer 108 is coupled to one input terminal of the NAND gate 102. The other input terminal to this gate is coupled to the output of inverter 101. The output of NAND gate 102 is coupled to line 99 through the inverter 103.

Referring now to both FIGS. 1 and 2, the operation of the minor system shall be described. As is explained in greater detail in the above mentioned copending application, the game microprocessor communicates the location of the upper left-hand corner of an object which is to be displayed to the CAM array, such as CAM array 11. When the count in the horizontal and vertical counters correspond to this location, a match condition occurs. Once a match condition occurs, the vertical comparison is locked out, that is, not considered, and a match condition occurs each time the beam reaches the desired horizontal location of the pattern. These match condition signals continue until the end of the pattern is reached.

Assume that a match condition is detected by the CAM array 11 and that the Minor System I of FIG. 2 is selected by the microprocessor to display a pattern. A signal is communicated to this minor system on line 35. The match condition signal is applied to the shift register 94 of FIG. 2 and is shifted through the three stages of this shift register at a rate of 3.58 MHz. This three stage register is employed to provide a delay in order that the output video signal from the shift register 55 is synchronized with other circuit functions, not the subject of the present application. When the match condition signal reaches the second stage of the shift register 94, it sets the bistable circuit 87 such that the Q output is high. This sets the Q output of the bistable circuit 88 high. This, in turn, generates a signal on line 97 which is used to remove the reset from the counters 60, 61, 62 63 and 64. When the match condition reaches the last stage of the shift register 94 it is communicated to the D terminal of the bistable circuit 89. This causes a hish output on line 96, thereby providing a load signal to the shift register 96. This load signal causes a single line of the pattern which is to be displayed to be shifted in parallel from the pattern RAM 48 into the shift register 55.

Each line of pattern data from the RAM 48 is shifted serially from register 55 onto line 41 to provide a control signal for the display beam. The rate at which each line of the pattern data from register 55 is shifted onto line 41 determines the size of the pattern. The data in the shift register is either shifted at the rate of 3.58 MHz or half this rate, that is, 1.79 MHz depending upon the state of the size bit communicated to the attribute latch 113 by the microprocessor. This size bit is coupled to the multiplexer 106 in order to select either $\theta$ or $\theta/2$. The selected one of these timing signals is then coupled to the multiplexer 108.

The least significant bit of the horizontal location information is stored within stage "9" of the attribute latch 113. This bit controls the selection of either the output of multiplexer 106 or the output of the inverter 107 through the multiplexer 108. By selecting $\theta$ or $\theta/2$, after this signal is inverted by inverter 107, causes a delay in $\theta$ and $\theta/2$. In effect, the selection of $\theta$ or $\theta/2$ from inverter 107 causes data to be shifted from register 55 on the trailing edge of $\theta$ or $\theta/2$ instead of the leading edge. In this manner, the contents of the stage "9" is used to define the final location of the pattern in the horizontal direction. The output of the multiplexer 108 is coupled to the shift register 55 through the NAND gate 102 and inverter 103. The signal coupled to the NAND gate 102 from the inverter 101 prevents shifting of data from the shift register 55 when data is being loaded into register 55 from the RAM 48.

The particular pattern which is to be displayed is stored within the RAM 48 and is communicated to this memory on the bus 21. During the time that the memory 48 is to be loaded with a pattern from the microprocessor, the ALE signal is coupled to the latch and decoder 50. This latch and decoder 50 then determines if the memory 48 is being selected by the microprocessor. If the minor system of FIG. 2 has been selected, memory 48 is enabled and will then accept data on bus 21. The latch 49 accepts signals from bus 21, which signals are coupled through the multiplexer 52 into the decoder 53. These signals are employed to select different ones of the eight lines in the RAM 48. The latch and decoder 112 is employed for the same reason as latch and decoder 50 and enables the attribute latch to receive the color, size and least significant bit location data from the microprocessor.

When a pattern stored within the RAM 48 is to be displayed, each line of the pattern is sequentially shifted in parallel into the shift register 55 and then serially read from this shift register as previously described. An addressing means comprising the counters 60, 61, 62, 63 and 64 is employed to sequentially address each of the lines in the pattern RAM 48. When the display is enabled, the signal on line 24 couples the lines 74, 75, and 76 through the nultiplexer 52 into the decoder 53. Initially the signals on lines 74, 75 and 76 are low since the counters are reset by the signal on line 97.

The counters are driven by the horizontal blanking signal (H) which is coupled from the display to the counter 60 on line 58. The counter 60 divides this clocking signal by two. H/2 is coupled to the multiplexer 67 and is selectable by this multiplexer for coupling to the counter 62. Counter 61 is employed to divide the H/2 signal by two to provide the $\overline{H}/4$ signal which is coupled through the AND gate 66 to the multiplexer 67. The AND gate 66 is employed to reduce the period during which the $\overline{H}/4$ signal remains high by a factor of two, although the frequency of the $\overline{H}/4$ signal is unaffected. The output of the AND gate 66 is shown as H'/4 to distinguish it from the H/4 signal. Either the H/2 or H'/4 signal is selected by the multiplexer 67 to drive the counter 62. As is apparent, if the H/2 signal is selected by multiplexer 67, counter 62 will change state for every two horizontal blanking signals. On the other hand, if the H'/4 signal is selected by the multiplexer 67, the counter 62 will change state for every four horizontal blanking signals. The determination of whether H/2 or H'/4 is selected is determined by the state of the size bit which is coupled to the multiplexer 67. Thus, the size bit is employed not only to expand a pattern in the horizontal direction through multiplexer 106 but also to expand a pattern in the vertical direction through the multiplexer 67.

The counters 62, 63 and 65 provide signals on lines 74, 75 and 76, which sequentially select each of the eight lines of the RAM 48. Initially, the signals on these lines are 000 as mentioned. Then assuming H/2 has been selected by multiplexer 67 after two horizontal blanking signals, the $A_\phi$ signal becomes high causing a signal to be applied to line 76. After two additional horizontal blanking pulses, the $A_\phi$ signal becomes low and the $A_1$ signal becomes high. This continues for eight cycles until the $A_\phi$, $A_1$ and $A_2$ outputs of counters 62, 63, and 64, respectively, are all high. This causes the last line of the pattern to be selected.

When the last line of the pattern is selected from RAM 48 for the second or fourth time, an end of pattern signal (EOP) is generated on line 81 at the output of gate 90. The input to gate 90 from the inverter 69 assures that the end of pattern signal is not generated until the last line of the pattern has been selected either twice or four times, depending on the state of the size bit on line 71. A low input is provided to the gate 90 by the NAND gate 78 when there is a high signal on lines 74, 75 and 76. The other input to the gate 90 (from inverter 101) causes the EOP signal to be generated after the pattern data has been shifted from the RAM into the shift register 55.

The gate 84 receives the EOP signal (line 81) and generates an output to reset the bistable circuit 87 after the last line of the pattern has been read from the RAM 48. The vertical blanking signal on line 82 will also reset circuit 87. This latter signal prevents additional pattern lines to be read from the RAM 48 after a frame has ended. Without this signal, a pattern may be split with a first portion of it appearing at the bottom of the display and another portion appearing at the top of the display on the next frame.

Thus, with the minor subsystem of FIG. 2, a pattern stored in the RAM 48 may be displayed. Unlike the major system, updated line information supplied to adder 30 on line 28 of FIG. 1 is not required. This allows the display of a pattern by a minor system with less control by the microprocessor a is required with a major system or the grouped major system. Additionally, since the patterns are stored in RAM 48, greater flexibility in providing a display is obtained. For example, since the contents of the RAM 48 may be read by the microprocessor, the RAMs of the minor systems may be employed to keep track of pattern orientation. By rearranging the data within a RAM, different patterns may be displayed.

Referring now to FIG. 3 and the grouped major system, one of the four CAM arrays of FIG. 1 is again shown in FIG. 3, however, separated into a line CAM 12a and a dot CAM 12b. The line CAM 12a is coupled to the line counter 15 such that the CAM compares the vertical beam position (as that position as defined by the contents of the line counter) with the desired vertical location stored in the CAM. Similarly, the dot CAM 12b is coupled to the dot counter 14. When a match occurs within the line CAM 12a it couples a signal to the vertical disable means 115. This means is employed to lock-out or disable the line CAM until the end of the pattern. The vertical disable means is coupled to the dot CAM and also to one input terminal of the AND gates 117 and 118. The dot CAM 12b for purposes of explanation, has been illustrated divided into two separate sections. One section compares the most significant (MS) four bits from the dot counter, and the other the least significant (LS) four bits. A match condition of the most significant four bits is communicated to the other input terminal of the AND gate 117 on line 136. A match condition of the least significant four bits of the dot CAM 12b is communicated to the other input terminal of the AND gate 118 on line 137.

The output from the AND gate 117 is coupled to one input terminal of the AND gate 119. The signal on this interconnecting line is identified as "HMU" (horizontal match upper). The output from the AND gate 118, line 139, is coupled to the other input terminal of the AND gate 119, one input terminal of an AND gate 121, one input terminal of AND gates 129 and 130, and to a group counter 133. The signal on line 139 is identified as "HML" (horizontal match lower). The output from the AND gate 119 and the output from the AND gate 121 are coupled to the input terminals of an OR gate 122. The output of this OR gate is coupled to the S terminal of a bistable circuit 124. The reset terminal of the circuit 124 receives a single on line 131. The Q terminal of the bistable circuit 124 is coupled to the other input terminal of the AND gate 130 and is coupled to the other input terminal of the AND gate 129 through the inverter 128. The output of the AND gate 129 is coupled to the four bit group counter 133 to provide a preset count in the counter 133. The output of the AND gate 130 is coupled to the group counter 133 so as to permit counting in the counter 133 when the output of the AND gate 130 goes high.

The output of the group counter 133 is coupled through a multiplexer to a group decoder 135. The counter 133, as will be explained in greater detail, acts as part of a selection means for selecting different patterns in the grouped patterns which are displayed by the grouped major system. The multiplexer 134 allows either the output of the group counter 133 or the bus 21 to be coupled as the input of the group decoder 135. The selection of either of these two inputs to the multiplexer 134 is a function of the signal on line 24, the display enable signal. The group decoder 135 performs an ordinary decoding function for the RAM 26, which RAM is also shown in FIG. 1. The output of the RAM 26 is coupled to the adder 30 (also shown in FIG. 1). Again as shown in FIG. 1, the output of the adder 30 is coupled to a pattern ROM such that patterns may be read from the pattern ROM 31 into the shift register 32.

In the presently preferred embodiment, four grouped major systems such as shown in FIG. 3 are employed except that the RAM 26, adder 30, pattern ROM 31 and shift register 32 are shared by each of the grouped major systems and the major system.

Assume for purposes of explanation that the microprocessor of FIG. 1 has placed the desired location of an object in the line CAM 12a and dot CAM 12b. When the count in the line counter 15 matches the line number stored within the line CAM 12a, a signal is communicated to the vertical disable means 115. A signal indicating a match condition in the line CAM remains at the output of the vertical disable means 115 until the end of the pattern. When a match occurs within the dot CAM 12b for both the most significant and least significant four bits, outputs occur at AND gates 117 and 118. This causes an output signal at the output of the AND gate 119 indicating that an initial match has occurred, that is, that the count in both the line counter and dot counter match the upper left-hand corner position of the desired pattern location. The signal at the output of gate 119 when coupled to the bistable circuit 124 causes the Q terminal of this circuit to change to its high state. The signal from the Q terminal of the circuit 124 along with the signal on line 139 (through gate 130) permits the group counter 133 to count with each HML signal. On the initial match, the group counter 133 contains a count of four (assuming the display has been enabled), this count through the group decoder 135, RAM 21 and adder 30 allows a first pattern to be selected from the ROM 31. When next the least significant four bits in the dot counter 14 matches the least significant four bits stored in the dot CAM, a signal is again generated on line 137. This causes the HML signal on line 139 to be generated and the count within the group counter 133 to change. The new count in the group counter 133 causes a second pattern to be selected from the ROM 31. Each time a match occurs between the least significant four bits of the dot counter and the contents of the dot CAM, the group counter 133 selects a different pattern in the ROM 31. Thus, after an initial match, the group counter 133 through the group decoder 135, RAM 21 and adder 33 selects four patterns in the ROM 31.

Since only the least significant four bits of the counter 14 are employed to generate the HML signal, this signal will occur periodically for each sixteen counts of the dot counter 14. Each pattern is eight counts wide as presently implemented, thus after an initial match, four patterns may be displayed, each of which are eight increments wide and which are separated by eight increments. Moreover, each of these patterns may be different since the group counter 133 allows the selection of four different patterns from the pattern ROM 31. The grouped major system is ideal for displaying evenly spaced patterns such as on a chess board or any alphanumeric display. It should be noted that four patterns are displayed with the grouped major system of FIG. 3 with a single CAM. Alternate implementations of the grouped major system of FIG. 3 will be apparent to one skilled in the art. For example, the least significant three bits of the dot CAM may be compared with the contents of the dot counter to change the spacing between the patterns.

It will be appreciated that numerous timing signals which are obvious to one skilled in the art are required to implement the four grouped major systems. As mentioned, the four group decoders operate into a single RAM 26. However, only one group decoder at a time addresses the RAM 26. The bistable circuit 124 and the equivalent bistable circuit in each of the four grouped major systems are employed to allow only one of the group counters to count. Other timing and control signals such as $T_1$ and the signal coupled to line 131 are generated.

Thus, a display circuit has been described which permits the display of a plurality of patterns with a fewer number of content-addressable memories than previously required. This is achieved by the grouped major system described above. The minor system described above permits the display of a pattern with a minimum amount of control by the microprocessor and is particularly adaptable for displaying smaller objects in a game, or the like, such as moving projectiles.

We claim:

1. A circuit for receiving digital signals from a processor and for providing a control signal for a raster scanned video display comprising:
    a memory having stored patterns to be displayed on said display;
    addressing means coupled to said memory for providing address signals to access said stored patterns in said memory, said addressing means adapted to receive a first timing signal synchronized with the horizontal beam drive of said display and to provide said address signals in response to receipt of said first timing signal such that each line of at least one of said stored patterns is addressed;
    shift register means coupled to said memory for receiving said stored patterns from said memory and for providing said control signals for said display;
    location means for locating objects on said display and for providing a second timing signal to said shift register means, said location means adapted to be coupled to said processor and said display;
    whereby signals from said shift register means are employed to control said video display and said addressing means provides address signals for accessing said patterns with a minimum of control by said processor.

2. The circuit defined by claim 1 wherein said second timing signal controls the loading of data from said memory into said shift register.

3. The circuit defined by claim 1 wherein said memory is a random-access memory adaptable for coupling to said processor.

4. The circuit defined by claim 3 wherein said addressing means sequentially selects each of said lines of said stored pattern.

5. The circuit defined by claim 4 wherein said addressing means includes selection means for reselecting the same line of said stored pattern such that a pattern may be enlarged in the vertical direction.

6. The circuit defined by claim 5 including means for controlling the rate at which data is shifted from said shift register means such that a pattern may be enlarged in the horizontal direction.

7. A circuit for providing an interface between a digital processor and a raster scanned display comprising:
    a memory for storing lines of a pattern for said display;
    a shift register coupled to said memory for receiving each of said lines of said pattern and for providing a control signal for said display;
    counting means coupled to receive a horizontal synchronization signal from said display for providing address signals to access lines in said memory, said counting means for providing same address signals for a predetermined number of consecutive horizontal synchronization signals;

whereby a pattern stored in said memory may be displayed with a minimum control by said processor and the size of said pattern may be readily controlled.

8. The circuit defined by claim 7 wherein said predetermined number may be changed by said processor.

9. The circuit defined by claim 7 including control means for controlling the rate at which said lines of said pattern are shifted from said register to provide said control signal.

10. The circuit defined by claim 9 including means for receiving data from said processor representative of the size of said pattern and wherein said data is employed to select said predetermined number and to select said rate at which said lines of said pattern are shifted from said register.

11. The circuit defined by claim 10 wherein said predetermined number is either 2 or 4 and said rate is either 3.158 MHz or 1.79 MHz.

12. A circuit for controlling patterns on a raster scanned display comprising:
   a digital counter for providing first digital signals representative of display beam position;
   comparator means for comparing said first signals with second signals representative of the desired location of an object on said display and for providing a first timing signal when the desired vertical location is reached and a plurality of second timing signals when desired horizontal locations are reached, said comparator means coupled to said digital counter;
   memory means for storing digital representations of a plurality of patterns;
   selection means for selecting from said memory means a plurality of said stored digital representations for each of said second timing signals and after receipt of said first timing signal, said selection means coupled between said comparator means and said memory means;
   register means for receiving said digital representations of patterns from said memory means and for providing a beam control signal for said display beam, said register means coupled to said memory means;
   whereby a plurality of patterns may be placed on said display beginning at said desired location on said display.

13. The circuit defined by claim 12 wherein said digital counter includes a vertical beam position section and a horizontal beam position section.

14. The circuit defined by claim 13 wherein a predetermined number of bits from said horizontal beam position section are continually compared in said comparator means to provide periodic ones of said second timing signals.

15. The circuit defined by claim 14 wherein said selection means includes a second digital counter which is incremented by said second timing signals.

* * * * *